United States Patent
Barriger

[15] 3,692,265
[45] Sept. 19, 1972

[54] CORNER MOUNTABLE BRACKETS

[72] Inventor: Forrest C. Barriger, 2617 Northwood Dr., San Jose, Calif. 95132

[22] Filed: Sept. 26, 1969

[21] Appl. No.: 861,332

[52] U.S. Cl.....................248/222, 287/20.92 D
[51] Int. Cl......................................G03b 21/00
[58] Field of Search..............248/222, 300; 108/42; 287/189.36 H, 20.92 C, 20.92 D, 20.92 Y

[56] References Cited

UNITED STATES PATENTS

| | | | |
|---|---|---|---|
| 2,906,487 | 9/1959 | Simon | 248/248 |
| 682,192 | 9/1901 | Hazen | 248/222 |
| 939,005 | 11/1909 | Goedeke | 248/222 X |
| 2,465,635 | 3/1949 | Conterio | 108/42 |
| 2,962,134 | 11/1960 | Lenhardt | 287/189.36 |
| 3,482,910 | 12/1969 | Debelius | 248/222 X |

Primary Examiner—J. Franklin Foss
Attorney—Paul B. Fihe

[57] ABSTRACT

Disclosed herein are corner mountable brackets having sides which must be flexed to fit into place. The angle made by the sides of the bracket differs from the corner angle where the bracket is to be mounted so that the bracket must be flexed to fit into the corner. The bracket exerts spring tension against the corner so that it tends to push against the corner members. To fasten the bracket in place, its sides are provided with fastening means, such as sharp tabs projecting toward the walls forming the corner. The tabs are forced into the corner members by the spring tension.

1 Claim, 8 Drawing Figures

PATENTED SEP 19 1972 3,692,265
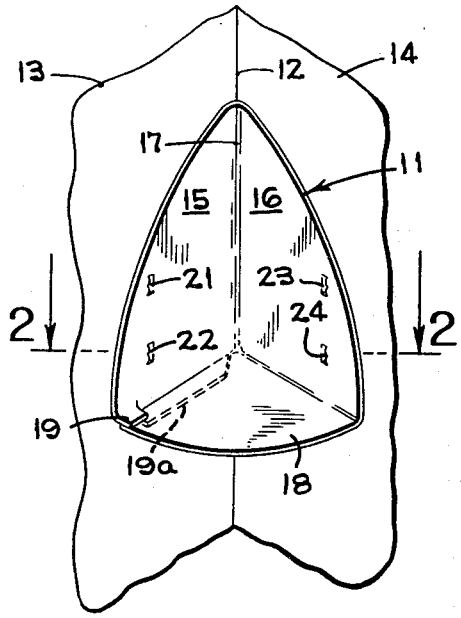
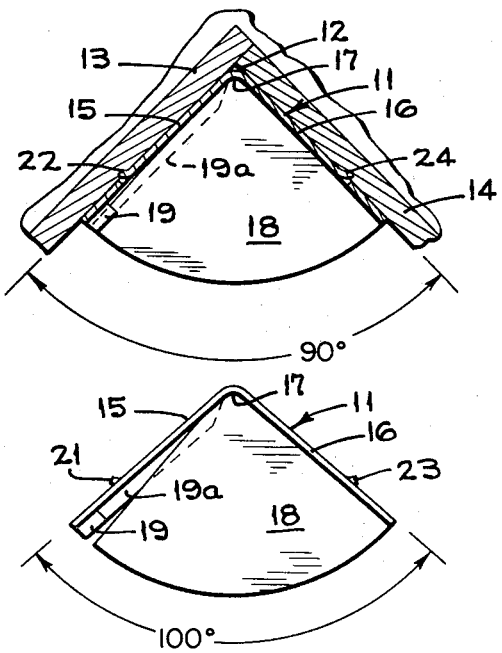
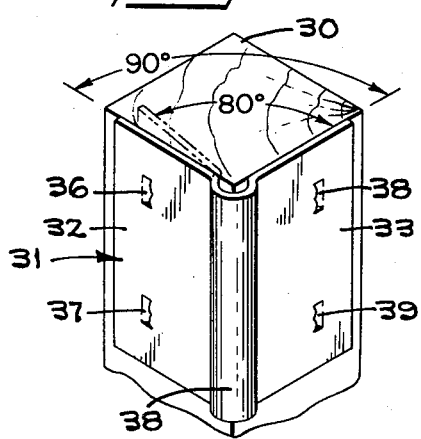
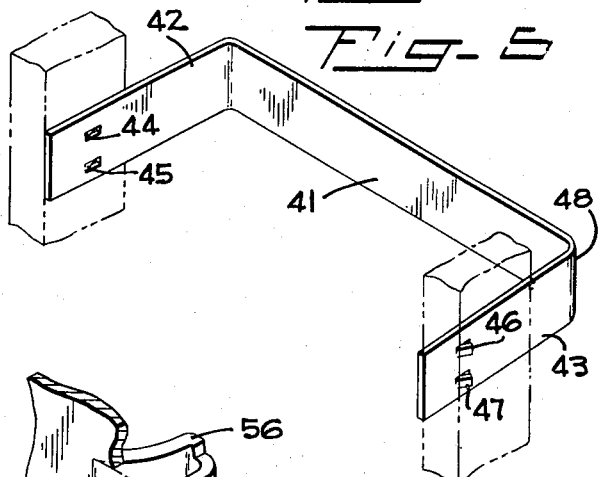
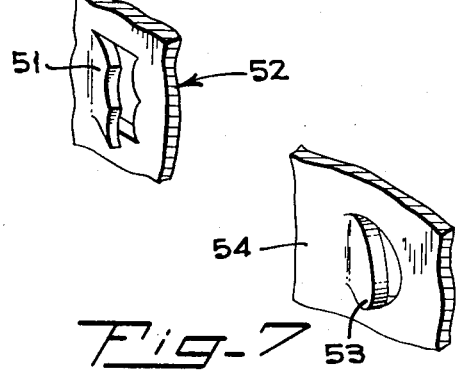
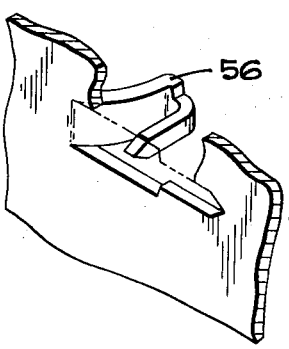
INVENTOR.
FORREST C. BARRIGER
BY
Paul B. Fihe
PATENT AGENT

CORNER MOUNTABLE BRACKETS

BACKGROUND OF THE INVENTION

The invention relates to the field of support brackets and more particularly, to easily securable corner mountable brackets.

Most support brackets are mounted by means of conventional fastening devices such as screws and nails. With today's high labor costs the time expended in installing conventional brackets with conventional fastening devices usually far exceeds the cost of the brackets. In large construction jobs where hundreds of brackets are used to mount fixtures, and the like, the expenditure in terms of labor becomes considerable. Furthermore, prior art fastening devices tend to scar or deface the wall where used, leaving unsightly holes when the device is removed.

Support brackets which are used in the home often lose some of their attractiveness when fastening devices penetrate the sides of the bracket. For example, brackets used to display art objects must be fastened through a wall so that the fastening devices do not detract from the object displayed. If the sides of the bracket are not penetrated, support for the bracket usually requires bracing from beneath the bracket. Usually such bracing can be hidden from view, but nevertheless, is often difficult to install and increases the amount of occupied wall space.

Still a further problem with support brackets of the prior art is that they are usually rigid so that they fit snugly between corner members intersecting at a precise angle, usually 90°. When the intersecting wall members where a bracket is mounted do not meet at precisely 90°, the fit of the bracket may leave something to be desired in terms of appearance and support properties.

SUMMARY OF THE INVENTION

The object of the invention is to provide a readily mountable support bracket for corners whose approximate angle is known. Another object of the invention is to provide a bracket which may be mounted into position in but a few seconds. Still another object of the invention is to provide a decorative bracket which requires no underlying bracing or support and has a generally asthetically pleasing appearance.

The above objects are achieved with a support bracket which includes first and second sides which are flexibly joined together. The sides are at least partially co-extensive so that the line joining them is common to an edge of each side thereby forming an angle between the sides. The angle between the sides is different from that of the corner in which the bracket is to be mounted. For example, when the bracket is to be mounted in a corner inside of a rectangular room, the bracket would have an angle slightly greater than 90°. On the other hand, when the bracket is to be mounted on a rectangular beam, i.e. an outside corner, the bracket would have an angle of slightly less than 90°. In each case the bracket sides would have to be flexed, one way or the other, to fit into or on the aforementioned corner and provide spring tension against being removed therefrom. To fasten the bracket into place, fastening means are associated with at least one side of the bracket so that the bracket may be secured into position. The fastening means are preferably sharp tabs which project from the bracket toward corner members and provide frictional resistance against being pulled.

In an alternative embodiment of the invention the bracket may be made three sided with a third side generally co-extensive with the first and second sides. All three sides are flexibly joined as mentioned above, with the bracket assuming a U-shape. The two angles formed by the three sides of the bracket are slightly different from those of the two corners or any two substantially parallel members where the bracket is to be mounted so that once again the bracket must be flexed to fit into the two corners.

BRIEF DESCRIPTION OF THE DRAWINGS

FIG. 1 is a perspective view of the apparatus of the invention mounted in a wall corner.

FIG. 2 is a horizontal section taken in line 2—2 in FIG. 1.

FIG. 3 is a top view of FIG. 1 illustrating a demounted or free standing position for the apparatus.

FIG. 4 is a perspective view of an alternate embodiment of the present invention for use with outside corners.

FIG. 5 is another alternate embodiment of the present invention for use between two studs.

FIG. 6 is a detailed view of the fastening means used in FIG. 1.

FIG. 7 is an alternate embodiment of the fastening means of FIG. 6.

FIG. 8 is another alternate embodiment of the fastening means of FIG. 6.

DESCRIPTION OF THE PREFERRED EMBODIMENTS

The apparatus of the present invention will be described with reference to the Figures. In FIG. 1 a support bracket 11 of the present invention is shown mounted in a corner 12 formed by two intersecting wall portions 13 and 14. The bracket is seen to be comprised of a first side 15 and a second side 16 being made from a single sheet of material and roundly bent along a line 17. The sides 15, 16 are generally co-extensive from the upper end of the sides, but side 16 includes a first extension 18 which, when folded upward, is perpendicular to the sides 15, 16 and spans the space between them. When the first extension 18 is folded upwardly it forms the supporting part of the bracket 11. The side 15 includes a slight second extension 19 which when folded upward is generally perpendicular to the sides 15, 16 and interlocks with the first extension 18 from the side 16. Interlocking is accomplished with a slit in the second extension 19 so that one portion of the extension 19 passes above the first extension 18, another portion 19a below it.

Fastening means are preferably attached to both sides 15, 16 of the bracket 11 in order to secure it in place. In FIG. 1 the tabs 21, 22 on side 15 tend to secure that side in place while the tabs 23, 24 tend to secure the side 16 into place. The tabs are especially effective since the sides, 15, 16 are made to converge at an angle different from that of the corner formed by the wall members 13, 14. Since the bracket 11 is shown in an inside mounting the angle between the sides 15, 16 would be slightly greater than the corner in which the bracket is mounted. For example, if the corner formed by the wall members 13, 14 is approximately 90° the angle formed by the sides 15, 16 when the bracket is in a free standing position is preferably about 100°. This characteristic forces the tabs 21, 22, 23, 24 to dig into the walls 13, 14 to prevent outward movement of a corner mounted bracket 11.

In the cutaway view of the apparatus shown in FIG. 2 the tabs 22, 24 may be seen to be projecting into the wall members 13, 14 thereby securing each side in place. FIG. 2 also shows the second extension having the second portion 19a indicated by the dotted line resting below the extension 18 to form the interlocking feature mentioned above.

FIG. 3 shows the bracket of FIG. 2 when the bracket is demounted. As previously explained, the angle between the sides of the bracket 15, 16 is approximately 100° when the bracket is free standing. When the bracket 11 is placed into the right angle position such as in FIG. 2, the bracket is flexed and placed under spring tension so that the bracket assumes the shape of the corner formed by the wall members 13, 14. However, even if the corner angle deviates slightly from a perfect 90° angle the bracket will assume the desired shape. The spring tension which exists in the bracket may be harnessed to prevent the bracket from springing outwardly. This is further assured by the fastening means 21, 22 and 23, 24 which positively secure the bracket in position.

FIG. 4 shows an alternate embodiment of FIG. 1 wherein the bracket 31 is mounted on an exterior corner such as that of a rectangular timber 30. In this case, sides 32,33 of the bracket, when in a free standing position, form an angle slightly less than that of the corner on which the bracket is to be mounted. For example, when the bracket is mounted on a right angle such as that formed by the timber 30, the choice of angle is approximately 80°. The tabs 36, 37, and 38, 39 once again face the corner formed by the sides of the timber 30. Note that in the embodiment of FIG. 4, the sides of the bracket are perfectly symmetrical with the support portion of the bracket being formed by the rounded corner 38 which is suitable for providing support to generally linear members.

FIG. 5 shows another alternate embodiment of the apparatus of FIG. 1 wherein the third side 43 is joined as an integal extension of the bracket sides 41, 42. The side 43 is flexibly joined to the bracket side 41 along the line 48. The included angle formed by the sides 43, 42 is different from e.g. slightly greater than the corner where the bracket is to be mounted. When the two sides are placed in tension, the entire bracket 40 may be flexed into position with the tabs 44, 45 and 46, 47 finally securing bracket.

FIGS. 6, 7, and 8 show various embodiments of the fastening means used to secure the various embodiments of the present invention in place. FIG. 6 shows a fork configuration wherein a three tined tab 51 projects outwardly from the sides of the bracket 52. The precise size and shape of the tines of the tab 51 are selected in accord with the material to which the bracket is to be fastened. For example, in masonry work generally flatter tines are used than against wood.

FIG. 7 shows a flat rounded tab 53 projecting from the wall 54 where the tab 53 is especially suited to fit into and be locked in place by a circular hole cut into metal walls. The rounded tab 53 is similar in shape and cross section to a partially pushed out "knock-out" of the type used in household electrical outlet terminals.

FIG. 8 shows an elongated nail type tab which is bent inwardly, then outwardly at right angles with a reverse bend. The tab 56 has a sharpened end suitable for deep penetration into wood for permanently securing a bracket into position. The nail type tab 56 is especially useful in construction projects where brackets are mounted for permanent installation. The tabs shown in FIG. 6, 7, and 8 are the preferable means for mounting the various brackets into position. It will be realized, however, that there are various alternative fastening means such as adhesives which may be placed on the sides of the brackets facing the corners wherein the bracket is to be mounted.

When using the bracket of the present invention, the bracket is merely flexed into the corner where the bracket is to reside then allowed to push against the sides of the corner so that the tabs may form an indentation and thereby secure the bracket into position. When the nail type tabs of FIG. 8 are used, a blow with a hammer on the inwardly projecting portion of the tab will further secure the support bracket of the present invention into a permanent position.

The present support bracket has a variety of uses limited only by the imagination of the user. For example, the bracket forms a perfect one piece shelf, as illustrated by the embodiment of FIG. 1. Furthermore, clothes racks, and hangers may be devised by simple modifications and additions to the bracket of the present invention. As an example, a clothes rack may be devised by mounting two of the support brackets 11 in opposite corners and extending a telescoping rod between the two brackets. The bracket may be reversed in its mounting wherever desirable. For example, the apparatus of FIG. 1 may be turned upside down to form a support shelf. The extensions 19, 19a insure that the shelf 18 will remain substantially rigid when the weight is placed on it either from above or below.

WHAT IS CLAIMED IS:
1. A support bracket for corner mounting comprising first and second integral sides flexibly joined along a line common to an edge of each side thereby forming an angle between said sides, said angle being different from that of the corner in which said bracket is to be mounted so that said bracket sides must be flexed to fit said corner, the first of said sides having an integral extension folded upwardly to be substantially perpendicular to said side and to span the space between said sides thereby forming a support between the sides of said bracket, the second of said sides having integral spaced extensions folded upwardly and arranged to receive therebetween said integral extension of said first side thereby to hold the support in supporting position, and fastening means including tabs struck integrally from both sides of said bracket facing the corner wherein said bracket is to be mounted.

* * * * *